Nov. 4, 1969　　　F. L. MURDOCK, SR　　　3,476,678
HORIZONTAL ELECTRIC EMULSION TREATER
Filed June 6, 1966　　　3 Sheets-Sheet 1

INVENTOR.
FORREST L. MURDOCK, SR.

BY *Head & Johnson*

ATTORNEYS

INVENTOR.
FORREST L. MURDOCK, SR.

BY *Head & Johnson*

ATTORNEYS

United States Patent Office 3,476,678
Patented Nov. 4, 1969

3,476,678
HORIZONTAL ELECTRIC EMULSION TREATER
Forrest L. Murdock, Sr., 2420 E. 24th,
Tulsa, Okla. 74114
Filed June 6, 1966, Ser. No. 555,343
Int. Cl. C10g 33/02; B01d 13/02; B03c 5/02
U.S. Cl. 204—308         12 Claims

ABSTRACT OF THE DISCLOSURE

This invention provides an emulsion treater for crude oil including a horizontal vessel with two spaced partitions dividing the vessel into three zones, the first and the last zones being quiescent settling zones with an intermediate treating zone in which is positioned spaced grids having an electric potential therebetween so that the emulsion flows through an electric field in passing from the first to the second quiescent zone.

---

This invention relates to a horizontal electric emulsion treater for crude oil. More particularly, this invention relates to a horizontal emulsion treater for crude oil including electric grid means for subjecting the crude oil emulsion to an electric field to augment the separation of water and gas therefrom.

An object of this invention is to provide an improved horizontal emulsion treater for crude oil.

A more particular object of this invention is to provide an improved horizontal emulsion treater for crude oil. Still more particularly an object of this invention is to provide an improved horizontal emulsion treater for crude oil including means of subjecting the crude oil emulsions to the effect of an electric field as the emulsion passes through the treater.

Another object of this invention is to provide an improved horizontal emulsion treater for crude oil including means of heating the crude oil emulsion as it flows upwardly through a quiescent zone within the treater.

Another object of this invention is to provide an improved horizontal crude oil emulsion treater including means of heating the crude oil as it flows downwardly within a quiescent zone within the treater.

Another object of this invention is to provide an improved horizontal treater for treating crude oil emulsions including means of subjecting the emulsion sequentially to heating and to an electric field to more efficiently remove the water therefrom and, in a particular arrangement of the invention, to subject the emulsion being treated to sequential electric fields for still more effective removal of water and gas from the emulsion.

Another object of this invention is to provide an improved horizontal treater for treating crude oil emulsions including means within the treater of subjecting the emulsion to an electric field and including means of varying the intensity of the electric field by varying the spacing between electric grids. A very particular object of the invention is to provide an improved horizontal treater for crude oil emulsions including electric grids within the treater for subjecting the emulsion to an electric field including means of heating the grids to remove paraffin accumulations therefrom.

Another object of the invention is to provide an improved horizontal treater for treating crude oil emulsion including electric grids within the treater and including means of detecting the water content of the emulsion and means of automatically de-energizing the electric grids when the water content of the emulsion approaches a preselected maximum level.

These and other objects will be fulfilled and a better understanding of the invention had by referring to the following description and claims, taken in conjunction with the attached drawings in which:

Figure 1:
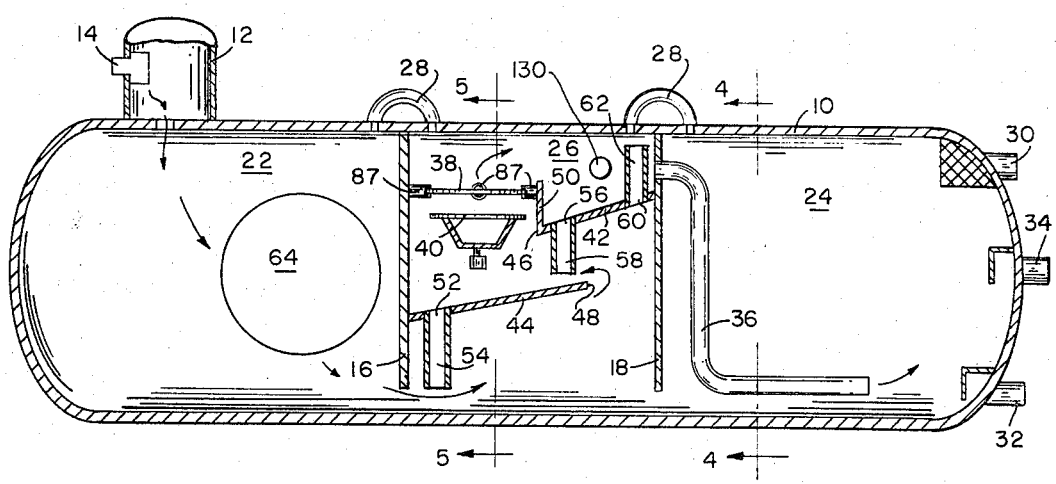
FIGURE 1 is a cross-sectional view of a basic horizontal treater of this invention.

Referring now to the drawing and first to FIGURE 1, the basic emulsion treater for crude oil of the invention is shown. The treater is housed in a vessel 10. Integrally formed with an extended upwardly from the vessel 10 is a short emulsion inlet receiving tower 12 having emulsion inlet 14 therein. The tower 12 is not an indispensable portion of the treater of this invention and the emulsion inlet 14 may communicate, if desired, directly with vessel 10. The lower portion of tower 12 communicates with the interior of vessel 10.

Formed within the vessel 10 is a first vertical partition 16 and a second vertical partition 18. The vertical partitions 16 and 18 are parallel to and spaced from each other and provide a first quiescent settling zone 22 and a second quiescent settling zone 24 in the vessel with a treating zone 26 therebetween. The lower portion of each of the zones 22, 24 and 26 communicate with each other, such as by the partitions 16 and 18 extending less than the full interior vertical height of the vessel, although such communications could be supplied by openings within full height partitions. In like manner, the upper portions of the zones 22, 24 and 26 each communicate with each other, such as by means of gas conducting conduits 28, although such communications could obviously be achieved by the partitions 16 and 18 extending less than the full interior height of the vessel, or by openings in such full extending height partitions adjacent the upper interior of the vessel.

Provided in the second quiescent settling zone 24 in the upper portion of the vessel is a gas outlet 30 which has communication with the upper portion of each of the zones 22, 24 and 26 by means of gas conducting conduits 28. A water outlet 32 in the lower portion of the vessel communicates with the lower portion of each of the zones 22, 24 and 26. An oil outlet 34 is provided at an intermediate height communicating with second quiescent settling zone 24.

An emulsion conduit 36 communicates the upper portion of treating zone 26 with the lower portion of second quiescent settling zone 24 whereby the emulsion flowing through the treater passes out the top portion of the treating zone 26 and into the lower portion of the second quiescent setting zone 24. The emulsion rises in second quiescent settling zone 24 until it is withdrawn through oil outlet 34.

An important part of this invention is the provision within the heating zone 26 of means of establishing an electric field through which the emulsion passes as it flows through the treater. This means is illustrated by grids 38 and 40. Grid 38 is a hot grid, that is, it receives voltage potential relative to grid 40, termed a ground grid, which is normally maintained at the potential of the vessel. The grids 38 and 40 are spaced from each other and when an electric charge is applied to the grid 38 relative to ground grid 40 an electric field is established therebetween to which the emulsion is subjected as it flows through the treater. The electric grid system will be described in greater detail subsequently.

Another important portion of this invention is the provision of means of reversing the direction of fluid flow within the treating zone 26 which is accomplished by the provision of an upper inclined baffle 42 and a lower inclined baffle 44. The baffles 42 and 44 are spaced from each other, are parallel to each other and are overlapping, providing a downwardly inclined flow passageway therebetween. Upper baffle 42 has the upper edge affixed to the second vertical partition 18 and extends downwardly, terminating in an outer edge 46 which is spaced from the first vertical partition 16. In converse manner, the lower partition 44 has one edge affixed to the first partition 16 and is inclined upwardly terminating in an outer edge 48 which is spaced from the second partition 18.

The grids 38 and 40 are positioned between the outer edge 46 of upper baffle 42 and the first partition wall 16 so that all emulsion flowing through the treating zone 26 flows between the inclined baffles and then upwardly through the grids.

In a preferred arrangement a planar vertical support member 50 is affixed at each end to the interior wall of the vessel 10 and has the lower edge thereof affixed to the outer edge 46 of the upper inclined baffle 42. The vertical support member 50 and the upper baffle 42 provide a horizontal trough extending wall to wall within the vessel 10. The grids 38 and 40 are positioned between the vertical support member 50 and the first vertical partition 16.

As fluid flows in the downwardly inclined passageway between the upper and lower baffles 42 and 44 it reverses direction to travel upwardly through the grids. Upon this reversal of direction water is extracted from the emulsion. In addition, water is separated by the effect of the electric field and this water falls downwardly on the top of lower baffle 44. An opening 52 is provided in the lower baffle 44 adjacent first partition 16 and a vertical water conduit 54 communicates the opening with the lower portion of the vessel 10 by which water flows into the lower portion of the vessel to be drawn off through water outlet 32. In like manner, an opening 56 is provided in the upper inclined baffle 52 adjacent the vertical support member 50 and water collected on the upper surface of the upper baffle 42 in the trough formed by the vertical support member 50 flows downwardly therethrough. A water conduit 58 communicates with opening 56 and carries the water downwardly, discharging it on the upper surface of lower baffle 44 where the water flows downwardly through opening 52 and conduit 54 to the lower portion of the vessel. It can be seen that, if desired, the water conduit 58 can be extended directly to the lower portion of vessel 10.

Gas released from the emulsion within the treating zone 26 below the baffles 42 and 44 is collected beneath the upper inclined baffle 42 and the second vertical partition 18. An opening 60 in the baffle 42 receives a gas conduit 62 by which the collected gas can pass freely into the upper portion of the vessel 10.

The arrangement of the treating zone 26 is a fundamental improvement encompassed with the treater of this invention. Provision of the electric grid system, particularly in combination with the overlapping spaced inclined baffles, provides a flow path configuration affording superior separation of gas and water from crude oil emulsions in an arrangement particularly adapted for a horizontal vessel.

Positioned in the first quiescent settling zone 72 is a heater 64 of the type long used in the petroleum industry by which heat may be imparted to the emulsion being treated. It has long been known that by raising the temperature of crude oil emulsion the viscosity thereof is lowered which more freely permits the separation of entrained water and gas. In the arrangement, FIGURE 1 provides a treater wherein the emulsion can be subjected to heat and sequentially to an electric field for greatly improved separation of water and gas, arranged in a unique system adapting such sequential treatment to a horizontal vessel.

The electric grids are illustrated as being positioned between the outer edge 46 of the upper inclined baffle 42 and the opposed first vertical partition 16. In can be seen that the grids can equally as well be positioned between the outer edge 48 and the second vertical portion 18, if desired, or electric grids could be positioned between both of the inclined baffles 42 and 44 and the opposed corresponding vertical partitions 16 and 18.

Figure 2:
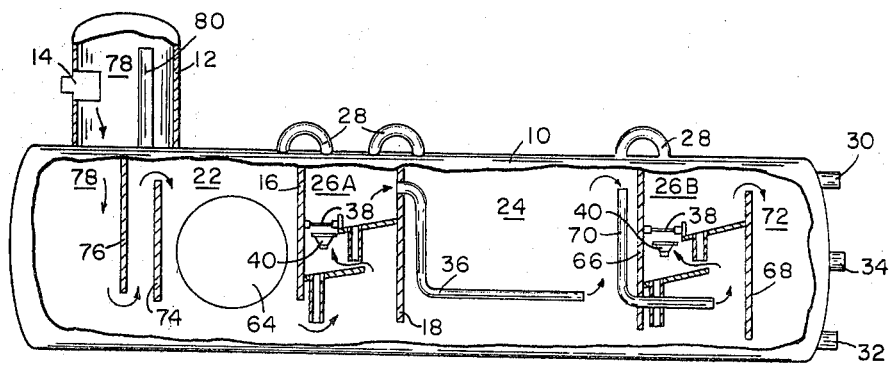
FIGURE 2 is a cross-sectional view of an improved arrangement of the horizontal treater of this invention showing an arrangement wherein the emulsion is heated as it passes downwardly in a quiescent zone.

FIGURE 1 illustrates basic concepts of this invention. In actual field practice such basic concepts will normally be incorporated in conjunction with more refined arrangements, such as are set forth in FIGURES 2 and 3, each of which utilize the basic concepts of the invention. FIGURE 2 particularly illustrates the adaptation of the principles of this invention to a horizontal treater providing for a downward flow of the emulsion as it passes over the heater 64. Further, the arrangement of FIGURE 2 provides a first and second treating zone, indicated by the numerals 26A and 26B. Each of the separate treating zones of FIGURE 2 includes electric grids 38 and 40 and function exactly as described with reference to the single treating zone of FIGURE 1. It is seen in the arrangement of FIGURE 2 that the second quiescent settling zone 24 is interposed between the two treating zones 26A and 26B. The arrangement of FIGURE 2 is particularly useful in treating highly dispersed emulsion in which water and gas separation is difficult. The emulsion is subjected not only to the effect of heater 64 in the first quiescent settling zone 22 but is further subjected to sequential electric fields separated by a quiescent settling zone. The use of the separate sequential electric fields has several advantages. The first is the obvious advantage of subjecting the emulsion to two fields instead of one. The second, and an important advantage, is that by the provision of two sequential electric fields the intensity of the fields can be separately varied. It has been learned that the intensity of electric fields to which crude oil emulsion can be subjected is limited by the water content of the emulsion. As the water content increases, the electric field must decrease otherwise the water serves in effect to short the fields. For this reason, as the water content increases the field intensity must be decreased. By the arrangement of FIGURE 2, the first electric field in treating zone 26A can be of a reduced intensity whereas the second field in treating zone 26B may be of greater intensity. Since a substantial portion of the water in the emulsion will be removed after passing through the first although lower intensity field of treating zone 26A and settled out in the quiescent settling zone 24, less water will be encountered as the emulsion flows through zone 26B and therefore the electric field intensity may be greater to more completely accomplish the separation of the remaining emulsion water. The means whereby the intensity of the electric field is varied will be described subsequently.

The arrangement of FIGURE 2 providing a second treating zone 26B is achieved by third and fourth vertical partitions 66 and 68 which are spaced from each other parallel the first and second partitions 16 and 18. To achieve vertical incidence of flow in the second quiescent settling zone 24 wherein the emulsion is delivered into the lower portion thereof by emulsion conduit 36, a second emulsion conduit 70 is provided which extends through the third vertical partition 66 and has one end communicating with the upper portion of the second quiescent settling zone 24. The other end of emulsion conduit 70 terminates in the lower portion of the second treating zone 26B. An outlet settling zone 72 is provided in the arrangement of FIGURE 2 between the fourth vertical partition 68 and the end of the vessel 10 having the gas, water and oil outlets 30, 32 and 34. The function of outlet settling zone 72 is to provide a final quiescent zone in which the emulsion, after having been treated as it passes through the vessel, is subjected prior to being withdrawn from the vessel.

The arrangement of FIGURE 2 further includes a fifth vertical partition 74 and a sixth vertical partition 76 spaced from the first vertical partition 16. The first quiescent settling zone 22 is formed between the first and fifth vertical partitions 16 and 74. The area between vertical partitions 74 and 76 is an upward flow channel delivering the emulsion into the first quiescent settling zone 22 at the upper portion thereof so that the emulsion flows downwardly past heater 64. For this reason the arrangement of FIGURE 2 is termed a downflow horizontal electric treater. Fifth vertical partition 74 terminates short of the interior height of the vessel 10. The sixth vertical partition extends from the top of the interior of the vessel 10 and downwardly, terminating short of the interior bottom of the vessel.

An inlet gas separation zone 78 is formed by the combination of the upper portion of the area within the vessel 10 between the sixth vertical partition 76 and the adjacent interior end wall of the vessel and the internal area of the tower 12. Emulsion flowing into the inlet 14 first encounters the gas separation zone 78 and most of the entrained gas leaves the emulsion in this zone. The gas released in zone 78 passes upwardly into the top of the tower 12. A gas conduit 80 communicates the upper portion of the tower 12 with the upper portion of the vessel 10 so that gas accumulated therein is withdrawn through gas outlet 30. An additional gas outlet may be provided in the upper portion of tower 12, if desired.

Figure 3:
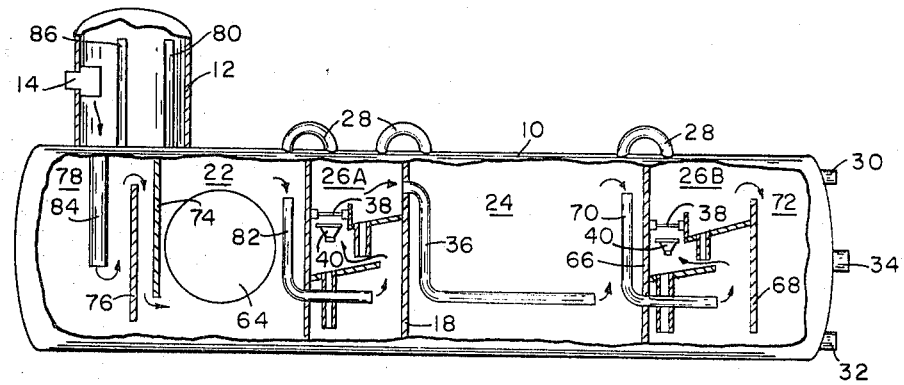
FIGURE 3 is a cross-sectional view of another improved arrangement of the horizontal treater of this invention showing the arrangement wherein the emulsion is subjected to sequential electric fields and, in addition, showing the arrangement wherein the emulsion is heated as it flows upwardly in a quiescent zone.

FIGURE 3 shows an alternate configuration of the invention substantially as shown in FIGURE 2 but showing the arrangement wherein the emulsion flows upwardly past heater 64 as it passes through the treater and for this reason the arrangement of FIGURE 3 is termed an up-flow electric treater. Fifth vertical partition 74 is affixed to the upper interior of the vessel and extends downwardly, terminating short of the interior lower vessel surface. The sixth vertical partition 76 terminates short of the upper interior of the vessel. By this arrangement the emulsion flows over the top of sixth partition 76, downwardly between the fifth and sixth vertical partition 74 and 76 and is discharged into the first quiescent settling zone beneath the heater 64. To insure that the fluid flows upwardly past heater 64, in the arrangement of FIGURE 3, an emulsion conduit 82 is provided having one end communicating with the upper portion of first quiescent settling zone 22 and the lower end communicating with lower portion of first treating zone 26A.

Other alternate arrangements of FIGURE 3 include a downwardly extending conduit 84 communicating at the upper end with the lower portion of tower 12 and terminating in the lower portion of gas separating zone 78. The arrangement of FIGURE 3 provides three separate fluid flow direction reversals to extract as much of the entrained water as possible from the emulsion before it flows into the lower portion of the first quiescent settling zone 22. In addition, in the arrangement of FIGURE 3, an additional gas conduit 86 is utilized to provide communication between the upper interior of the vessel between each side of the vertical partition 74.

As previously stated, FIGURE 1 illustrates the basic concept of the invention. FIGURES 2 and 3 are illustrative of the application of this concept to treaters as would be utilized in the petroleum industry. FIGURES 2 and 3 illustrate the various practical arrangements which may be utilized to incorporate the fundamentals of the invention as shown in FIGURE 1.

Figure 4:
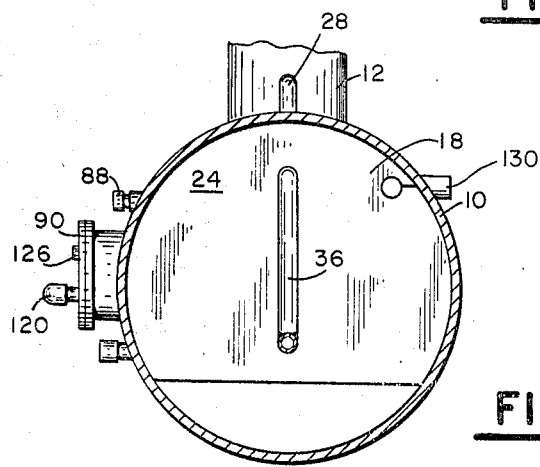
FIGURE 4 is a cross-sectional view taken along the line 4—4 of FIGURE 1 showing the arrangement of the second quiescent settling zone of the treater of this invention.

FIGURE 4 is a cross-sectional view showing the internal arrangement of the second quiescent settling zone 24 as shown in FIGURE 1.

Figure 5:
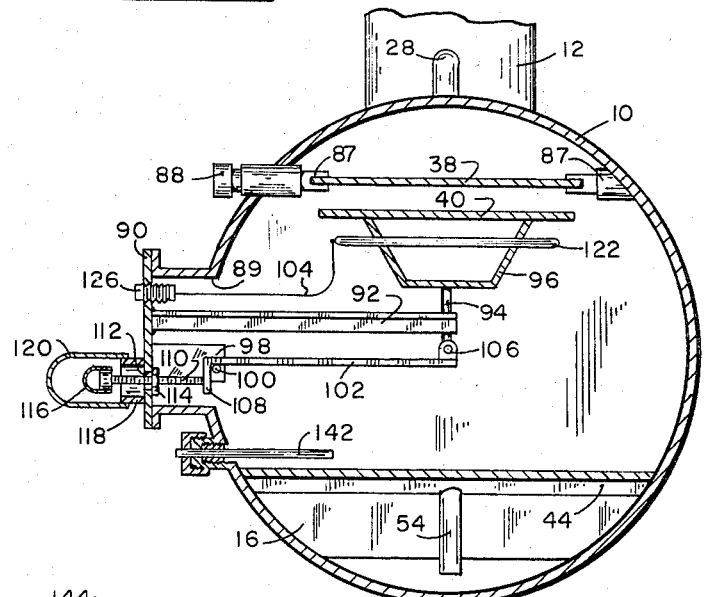
FIGURE 5 is a cross-sectional view taken along the line 5—5 of FIGURE 1 showing the treating chamber of the invention in the plane of a cross-section perpendicular the longitudinal axis of the treater and showing the details of the arrangement of the invention wherein the spacing between the electric grids may be varied.

Referring to FIGURE 5, a cross-sectional view taken through the treating zone 26 of FIGURE 1, the arrangement of the electric grid portion of the invention and particularly the arrangement whereby the spacing between the grids may be varied is best illustrated.

As previously indicated, one of the important features of this invention is the provision of means of exposing the emulsion to an electric field provided by the electric grid system. Referring to FIGURE 5, the electric grid system of the invention is shown in larger detail. Basically, the grid system consists of a hot grid 38 which is impressed with an electric voltage potential relative to a ground grid 40 maintained at the potential of the vessel, so that an electric field exists between the grids 38 and 40. Insulators 87 support the hot grid 38. An insulating electrical connector 88 provides means whereby electric potential is conveyed from the exterior of the vessel to the hot grid 38.

To afford means of installing, inspecting and calibrating the electrical grid system of the invention, an opening 89 is provided in the vessel 10 covered by man-way cover 90. A support bracket 92 extends horizontal from the interior of the man-way cover 90 and provides means for supporting the ground grid 40. As shown, a vertically extending rod 94 has affixed at the upper end thereof a support frame 96 which supports the ground grid 40. Rod 94 is slidably supported by the bracket 92.

A second bracket 98 extends from the man-way cover 90 below and parallel to the support bracket 92, the bracket 98 pivotally supporting a pivot arm 102, the arm being pivoted about pin 100. The outer end of the pivot arm 102 has a vertical bracket 106 which is pivotally affixed to the lower end of the ground grid rod 94. A threaded bolt 110 extending through an opening 112 in the man-way cover 90 has the inward end thereof in engagement with a downwardly extending leg portion 108 of pivot arm 102. The bolt 110 may be threadably supported in a variety of ways, such as by a threaded nut 114 welded to the interior of the man-way cover 90. The other end of the bolt 110 is provided with a head 116 by means of which the bolt is easily threadably advanced or retarded. A tubular collar member 118 affixed to the outer surface of the man-way cover 90 encloses the opening 112 and receives a threaded cover 120 whereby the opening 112 is closed.

It can be seen that by threadably positioning bolt 110 the angle of displacement relative to the horizontal of pivot arm 102 is varied and thereby the elevation of the ground grid 40 is varied to change the grid spacing. In this way the intensity of the electric field, which is generally inversely proportional to the distance between the grids, is adjustable.

An additional important element of this invention is the provision of means of preventing the accumulation of paraffin on the grids 38 and 40. This is accomplished by supporting a heating element 122 directly below the ground grid 40. The ground grid is connected to an electrical source by a conductor 124 which extends through an insulator connector 126 in the man-way cover 90.

Figure 6:
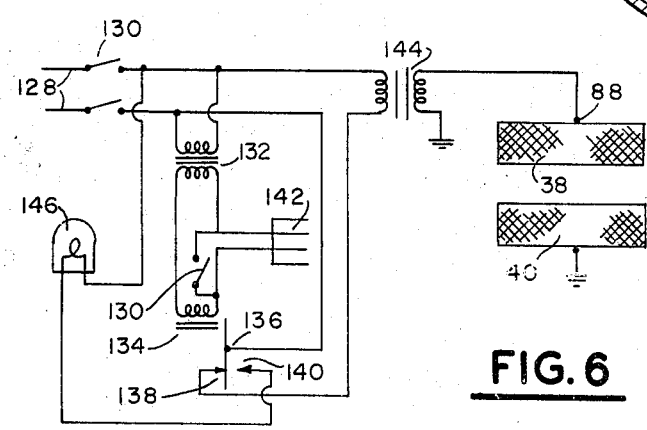
FIGURE 6 is a rudimentary wiring diagram showing means wherein the emulsion water content is detected and the electric field between the spaced grids extinguished when the water content reaches a preselected high level.

An additional important part of the invention is the provision of means of safeguarding the electric grid system by controlling the electrical potential supply to the grids in such a manner that the grid potential is automatically discontinued when the water content of the emulsion being treated approaches that which would short-circuit the grid elements. By short-circuit it is meant that the water content, which directly affects the conductivity of the emulsion, becomes so high that the current flow between the grids 38 and 40 exceeds the current carrying potential of the electrical facilities supplying the grid system. This system of automatically interrupting the voltage to the grid system when excessive water content occurs is best illustrated in the circuit diagram of FIGURE 6. Voltage is supplied to the grid system by means of conductors 128. A circuit breaker 130 is provided as a means of energizing or de-energizing the electrical grid system. A low voltage transformer 132 is energized when circuit breaker 130 is closed, the secondary of the low voltage transformer 132 providing voltage to energize a relay 134. Relay 134 includes a clapper arm 136 and contacts 138 and 140. In series with the relay 134 is a capacitance probe 142 which is responsive to the water content of the emulsion. As shown in FIGURE 5, the capacitance probe 142 is positioned in the treater directly below the grid system so that the water content of the emulsion passing upwardly through the grid system is detected. The capacitance probe 142 is a standard item of equipment utilized in the petroleum industry, especially in automatic custody transfer equipment. In the circuit of FIGURE 6, the capacitance probe functions to provide a high resistance circuit when the water content of the emulsion is below a preselected level. As long as the probe 142 has a high resistance, relay 134 is non-actuated so that continuity is provided with relay contact 134 and thereby with high voltage transformer 144. The secondary of the high voltage transformer 144 is communicated through insulated electrical connector 88 to the hot grid 38. With the hot grid 38 energized an electrical field is created between the hot and cold grids.

If the capacitance probe 142 detects a water level at or above a preselected maximum tolerable percentage, a low resistance circuit is presented which causes relay 138 to actuate, interrupting voltage to the high voltage transformer 144 and at the same time applying voltage to an indicator light 146.

An additional improvement of this invention is the provision of means of de-energizing the electric grid system when the fluid level drops below the grid level. It is important that the grids be immersed in liquid all the time while energized, one of the reasons being that if the grids are not immersed the high voltage thereacross could cause a spark, which in a hydrocarbon gas atmosphere, might result in an explosion. A liquid level detection 130, such as a float switch, is positioned in the vessel in the area of the grids (see FIGURES 1 and 4). Detector 130 is connected to de-energize the grids when the liquid level falls. One method of such connection is illustrated in the circuit diagram of FIGURE 6. Liquid level detector 130 is placed in parallel with capacitance probe 142. Detector 130 is open when the liquid level is high enough to cover the grids. When the level falls, detector 130 closes, energizing relay 136, breaking contact 138, thereby de-energizing the grids. It can be seen that liquid level detector 130 may be connected in a variety of other ways to de-energize the grids upon low liquid level and may include an arrangement using a switch which opens on low-fluid level.

Figure 7:
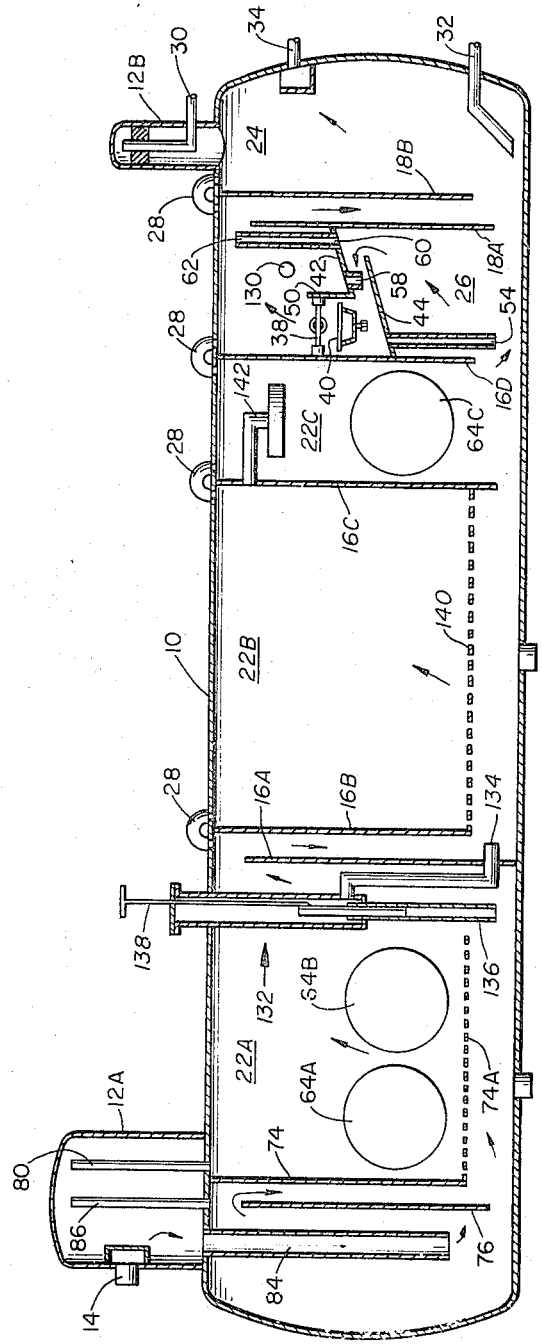
FIGURE 7 is a cross-sectional view of an alternate embodiment of the invention including a siphon arrangement to insure a liquid level in the area of the heater which will always be of a level to cover the heater.

FIGURE 7 illustrates an embodiment of the invention assuring that fluid will at all times cover the heater. In this embodiment the heater consists of three portions 64A, 64B and 64C. Partition 16A extends to the bottom of the vessel dividing the first quiescent settling zone into portions 22A and 22B and provides a flow passageway over the top thereof. A water siphon 132 in chamber 22A has an outlet pipe 134 communicating with the lower portion of zone 22B. A siphon intake pipe 136 extends to the bottom of zone 22A. Water is siphoned from the lower portion of zone 22A into the lower portion of zone 22B, however, no siphoning can occur unless the fluid level in zone 22A is of a sufficient height, the height being controllable by handle 138 extending externally of the treater. By adjusting handle 138 the height at which siphoning will occur can be adjusted such as to always be sufficient to cover heaters 64A and 64B.

Partition 16B and 16C provides a quiescent settling zone 22B. A perforated spreader 140 across the bottom thereof provides for even distribution of the upward flow of fluid in the zone.

In the arrangement of FIGURE 7 the settling zone preparator to electric treating is divided into a third portion, that is, settling zone 22C, by partitions 16C and 16D, contain a third heater 64C. A crude conduit and spreader 142 conducts crude from the top of zone 22B causing it to flow downwardly past heater 64C before passing to zone 26 wherein the crude is subjected to an electric field.

Spaced partitions 18A and 18B cause the crude to flow from the top of treating zone 26 to the lower portion of final quiescent zone 24. The embodiments of FIGURES 2, 3 and 7 are illustrative of the numerous arrangements to which the basic concept of the invention as shown in FIGURE 1 is adaptive.

While the invention has been described with a certain degree of particularity, it is manifest that many changes may be made in the details of construction and the arrangement of components without departing from the spirit and the scope of this disclosure.

What is claimed:

1. A horizontal electric emulsion treater for crude oil comprising:
   a closed horizontal vessel having a crude oil emulsion inlet, an oil outlet, a gas outlet and a water outlet therein;
   a first and second spaced vertical partition dividing said vessel into a first quiescent settling zone, a second quiescent settling zone and a treating zone between said quiescent zones, said emulsion inlet communicating with said first quiescent settling zone, said water outlet communicating with the lower portion of said second quiescent settling zone, said oil outlet communicating with the intermediate portion of said second quiescent settling zone, and said gas outlet communicating with the upper portion of said second quiescent settling zone, the upper and lower portions of each of said zones having separate common communication and including an oil passage opening in said second partition separating said treating zone with said second quiescent settling zone whereby emulsion flows upwardly through said treating zone; and
   spaced parallel electric grids supported within said treating zone through which said crude oil flows, said grids insulated from each other and having an electric potential therebetween.

2. A treater according to claim 1 wherein the space between said grids is variable by means externally of said vessel.

3. A treater according to claim 1 including electric emulsion heating means adjacent said grids to remove paraffin accumulation therefrom.

4. A treater according to claim 1 including a water content probe positioned within one of said zones in the path of emulsion flow through said treater; and
   circuit means controlling voltage to said grid system, said circuit means responsive to said water content probe to interrupt voltage to said grid system when the percentage of water in the emulsion exceeds a predetermined amount.

5. A treater according to claim 1 including means of heating the crude oil in said first quiescent settling zone.

6. A treater according to claim 5 including means directing the flow of crude oil emulsion in said first quiescent settling zone upwardly past said heating means.

7. A treater according to claim 5 including means directing the flow of crude oil emulsion in said first quiescent settling zone downwardly past said heating means.

8. A treater according to claim 1 including:
a lower and an upper imperforate baffle within said treating zone, the lower baffle having one edge affixed to said first vertical partition and inclined upwardly terminating in an outer edge adjacent to and spaced from said second vertical partition, the upper baffle having one edge affixed to the said second vertical partition and inclined downwardly above said lower baffle and terminating at an outer edge adjacent to and spaced from said first vertical partition, said inclined baffles being parallel to and spaced from each other in overlapping relationship and providing a downwardly inclined flow path therebetween, and wherein said electric grids are positioned between said outer edge of one of said upper and lower inclined baffles and the said vertical partition opposite thereto.

9. A treater according to claim 8 including a planar vertical support member affixed at each end thereof to the interior wall of said vessel and having the lower edge thereof affixed to said outer edge of said upper inclined baffle, the vertical support member and said upper baffle defining a horizontal trough extending wall to wall within said vessel, said electric grids being supported between said vertical support member and said first vertical partition.

10. A treater according to claim 8 wherein said upper baffle has an opening therein adjacent said vertical support member and including a water conducting pipe communicating with said opening and extending downwardly towards the lower portion of said vessel.

11. A treater according to claim 8 including a third and fourth spaced horizontal partition in said vessel dividing said vessel into a second treating zone separated from said first treating zone by said second quiescent settling zone and a third quiescent settling zone spaced from said second quiescent settling zone by said second treating zone, said water outlet communicating with the lower portion of said third quiescent settling zone, said oil outlet communicating with the intermediate portion of said third quiescent settling zone and said gas outlet communicating with the upper portion of said third quiescent settling zone, the upper and lower portions of each of said quiescent settling and treating zones having separate common communication;
means conducting emulsion flow from the upper portion of said second quiescent settling zone to the lower portion of said second treating zone;
means conducting emulsion flow from the upper portion of said second treating zone to said third quiescent settling zone whereby the emulsion flows upwardly through said second treating zone; and
spaced parallel electric grids supported within said second treating zone through which said emulsion flows, said grids insulated from each other and having an electric potential therebetween.

12. A treater according to claim 8 including:
a lower and an upper imperforate baffle within said second treating zone, the lower baffle having one edge affixed to said third vertical partition and inclined upwardly terminating in an outer edge adjacent to and spaced from said fourth vertical partition, the upper baffle having one edge affixed to said fourth vertical partition and inclined downwardly above said first baffle and terminating at an outer edge adjacent to and spaced from said third vertical partition, said baffles being parallel to and spaced from each other in overlapping relationship and providing a downwardly inclined flow path therebetween, and wherein said electric grids are positioned between said outer edge of said upper baffle and said third vertical partition.

References Cited

UNITED STATES PATENTS

| | | | |
|---|---|---|---|
| 2,136,469 | 11/1938 | Sauer | 204—306 |
| 3,121,055 | 2/1964 | Carswell | 204—302 |
| 3,148,134 | 9/1964 | Stenzel | 204—302 |
| 3,255,571 | 6/1966 | Walker et al. | 204—308 |
| 3,269,931 | 8/1966 | Darby et al. | 204—302 |

JOHN H. MACK, Primary Examiner

T. TUFARIELLO, Assistant Examiner

U.S. Cl. X.R.

55—9; 204—302